Jan. 5, 1960     J. D. OWEN     2,920,266
ELECTRICAL WELL LOGGING
Filed Aug. 8, 1956     3 Sheets-Sheet 1

INVENTOR.
J. D. OWEN
BY Hudson & Young
ATTORNEYS

INVENTOR.
J. D. OWEN
BY Hudson & Young
ATTORNEYS

United States Patent Office 2,920,266
Patented Jan. 5, 1960

2,920,266

ELECTRICAL WELL LOGGING

Joe D. Owen, Bartlesville, Okla., assignor to Phillips Petroleum Company, a corporation of Delaware Application August 8, 1956, Serial No. 602,832

13 Claims. (Cl. 324—1)

This invention relates to the logging of wells to detect oil bearing formations.

A number of well logging systems are known which provide information regarding strata intersected by a bore hole. One particular system involves measuring the electrical resistivity of the formations. The resulting information has proved quite valuable in detecting oil bearing zones. However, considerable computation and corrections are generally necessary to provide reliable data. It has long been desired to have a logging system which is capable of providing direct and rapid indications of oil bearing formations. The present invention is directed toward providing such a system.

When mud filtrate invades a formation which contains displaceable hydrocarbons, most of the oil or gas is pushed out, leaving residual oil. The connate water is also swept out because the irreducible water is mobile in the presence of a water phase. The irreducible water thus forms a bank between the virgin oil zone and the invading filtrate. The resulting annular zone of formation water has an electrical resistivity which is lower than the resistivity of the oil bearing zone. The resistivity of the mud filtrate normally is higher than that of the formation water. This resistivity configuration, which varies from high to low to high, as the distance from the bore hole increases, is thus characteristic of zones which contain displaceable hydrocarbons.

The detection of such an intermediate zone can be accomplished by employing conventional resistivity logging procedures to measure resistivities at several distances from the bore hole at a given depth. The problem in interpretation is to find a curve or series of curves of resistivity of the intermediate zone which read lower than the resistivity curves of the deep and shallow zones. In order to interpret such a displacement log for 5000 feet of a well, for example, approximately two man-weeks of computation and recording time are required. This is not satisfactory for most field operations.

In accordance with the present invention, an improved well logging system is provided which is capable of providing an immediate indication of intermediate zones of low resistivity. This is accomplished by the use of apparatus which measures formation resistivities simultaneously at a plurality of spacings. Signals representing resistivities of adjacent zones are subtracted from one another. The differences can be recorded to provide immediate indications of low resistivity zones.

Accordingly, it is an object of this invention to provide apparatus for locating zones of mobile hydrocarbons intersected by a bore hole.

Another object is to provide apparatus for measuring resistivities of earth formations at different distances from a bore hole.

A further object is to provide apparatus for indicating differences between resistivities of different zones of earth formations spaced from a bore hole.

Other objects, advantages and features of the invention should become apparent from the following detailed description which is taken in conjunction with the accompanying drawing in which.

Figures 1, 2:
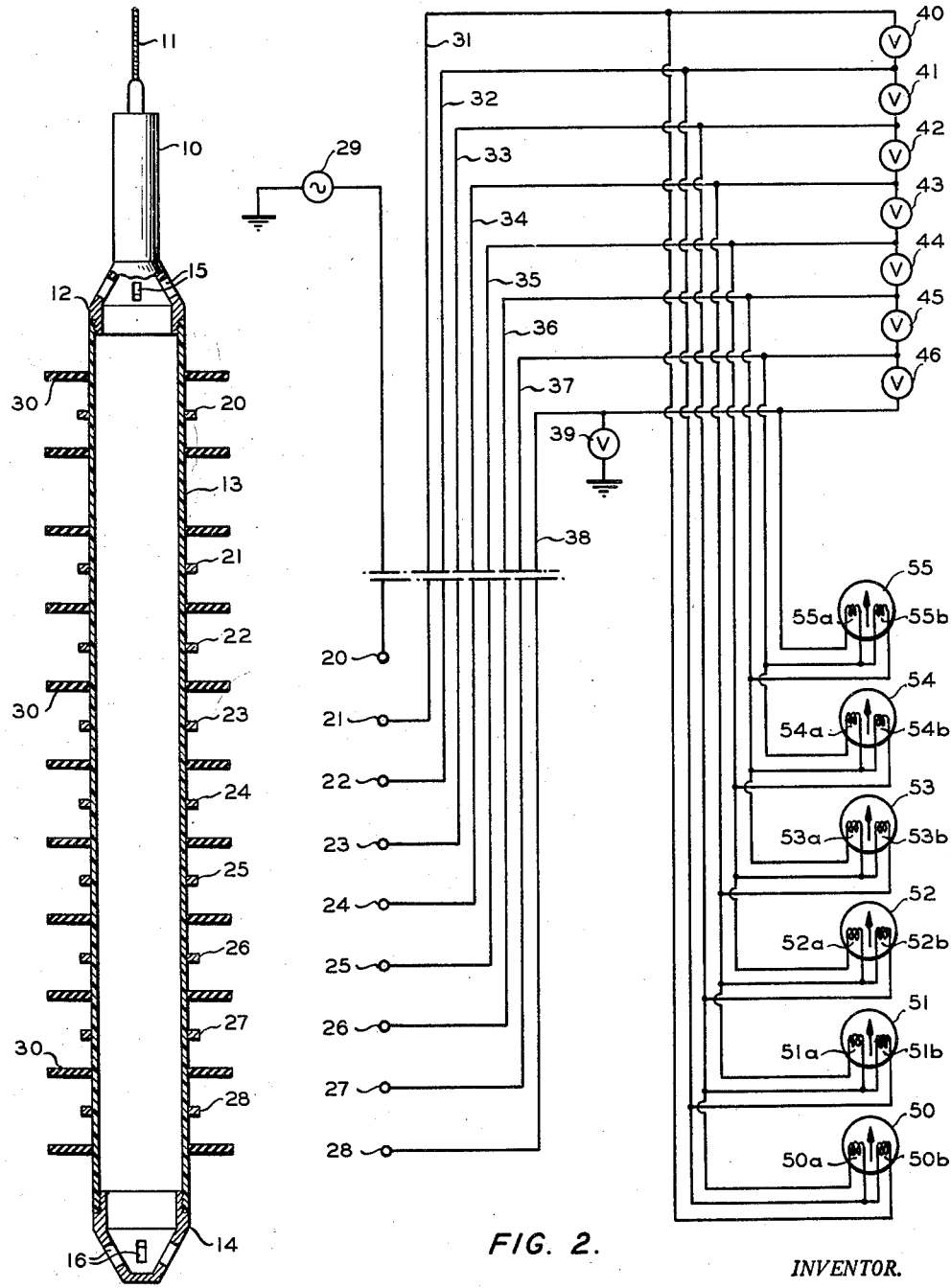
Figure 1 is a view, shown partially in section, of well logging apparatus which can be employed in carrying out this invention.
Figure 2 is a schematic circuit diagram of a first embodiment of the well logging apparatus of this invention.

Referring now to the drawing in detail and to Figure 1 in particular, there is shown an assembly which can be employed in making resistivity measurements in accordance with this invention. The apparatus comprises a housing 10 which is adapted to be lowered into a well by means of a cable 11. A shoulder 12 depends from the lower end of housing 10 and supports an elongated hollow casing 13. A cap 14 is attached to the second end of casing 13. Shoulder 12 and cap 14 are provided with respective openings 15 and 16 so that drilling fluid can pass through the interior of casing 13 when the assembly is raised and lowered in a bore hole. A plurality of electrodes 20 to 28, which can be in the form of circular metal rings, are mounted on casing 13 in spaced relationship with one another. These electrodes are separated from one another by means of bumpers 30 which are formed of electrically insulating material. These bumpers serve the dual function of orientating the assembly in the bore hole and preventing current flow longitudinally through the bore hole. The bumpers preferably are formed of a flexible material such as rubber.

In Figure 2, there is shown a simplified circuit of the electrical components of the present invention which are associated with the well logging assembly. A current source 29 is connected between electrode 20 and a remote point of reference potential. Current source 29 can be grounded at the surface by means of the metal sheath of cable 11 to provide such a point of reference potential. Electrical leads 31 to 38 are attached to electrodes 21 to 28, respectively, and extend from these electrodes upwardly to the surface within cable 11. Voltage indicating meters 40 to 46 are connected between the leads that are connected to adjacent electrodes. For example, meter 40 is connected between leads 31 and 32, and meter 46 is connected between leads 37 and 38. A voltage indicating meter 39 is connected between one of the leads and ground to provide a measurement of the spontaneous potential at one of the electrodes in the bore hole, 28 for example. Meters 39 to 46 preferably are recording instruments which provide a permanent record of the measured voltages. These voltages are representative of the resistivities of sections of the earth formation surrounding the logging assembly. For example, the measured voltage between electrodes 21 and 22 is a function of the resistivity of a section of the earth formation spaced horizontally from electrode 20 the same distance electrodes 21 and 22 are spaced vertically from electrode 20. The three electrodes thus provide a conventional three electrode resistivity logging assembly of the type well known to those skilled in the art. The records provided by meters 40 to 46 thus provide indications of the earth resistivities at various spacings from the bore hole. Electrodes 21 to 28 can be spaced 8 inches from one another, with electrode 21 being spaced 12 inches from electrode 20, for example.

The records provided by meters 40 to 46 are sufficient to permit an operator to determine regions containing displaced hydrocarbons, as previously described. However, the computations required to obtain this information from the resistivity measurement alone are time consuming. The present invention provides additional apparatus which enables zones of mobile hydrocarbons to be detected immediately. A current indicating device 50 is provided to record continuously the differences between the resistivities measured by meters 40 and 41. Meter 50 can be a recording galvanometer which is provided with respective coils 50a and 50b. Coil 50a is connected between leads 32 and 33 and coil 50b is connected between leads 31 and 32. The two coils tend to oppose one another so that the galvanometer needle is deflected in accordance with the differences between the currents through the two coils. The recorded signal is thus representative of the difference between the resistivities of the two measured zones. Corresponding current indicating meters 51 to 55 are provided to measure the differences between the other resistivity measurements. For example, meter 55 is provided with a coil 55a that is connected between leads 37 and 38 and a coil 55b which is connected between leads 36 and 37.

Figure 3:
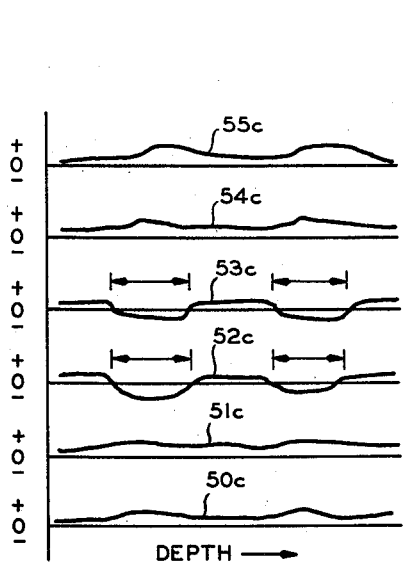
Figure 3 is a graphical representation of typical records produced by the apparatus of this invention.

Meters 50 to 55 preferably are of the recording type which provide permanent records of the potential differences. Figure 3 is a graphical representation of typical records produced by these meters. Curves 50c to 55c represent the recorded deflections of the needles of galvanometer 50 to 55, respectively. It can be seen that curves 50c, 51c, 54c and 55c represent galvanometer deflections in one direction only. The curves 52c and 53c have regions, indicated by the arrows, wherein the galvanometer deflections are in the opposite direction. These regions indicate zones of mobile hydrocarbons wherein the intermediate water layer has a resistivity lower than that of the mud filtrate and the displaced hydrocarbons. The records provide an immediate indication of such zones because the galvanometer deflections are in reverse directions. This eliminates the need for a comparison of a series of curves as has previously been required when resistivity measurements alone were made.

Figure 4:
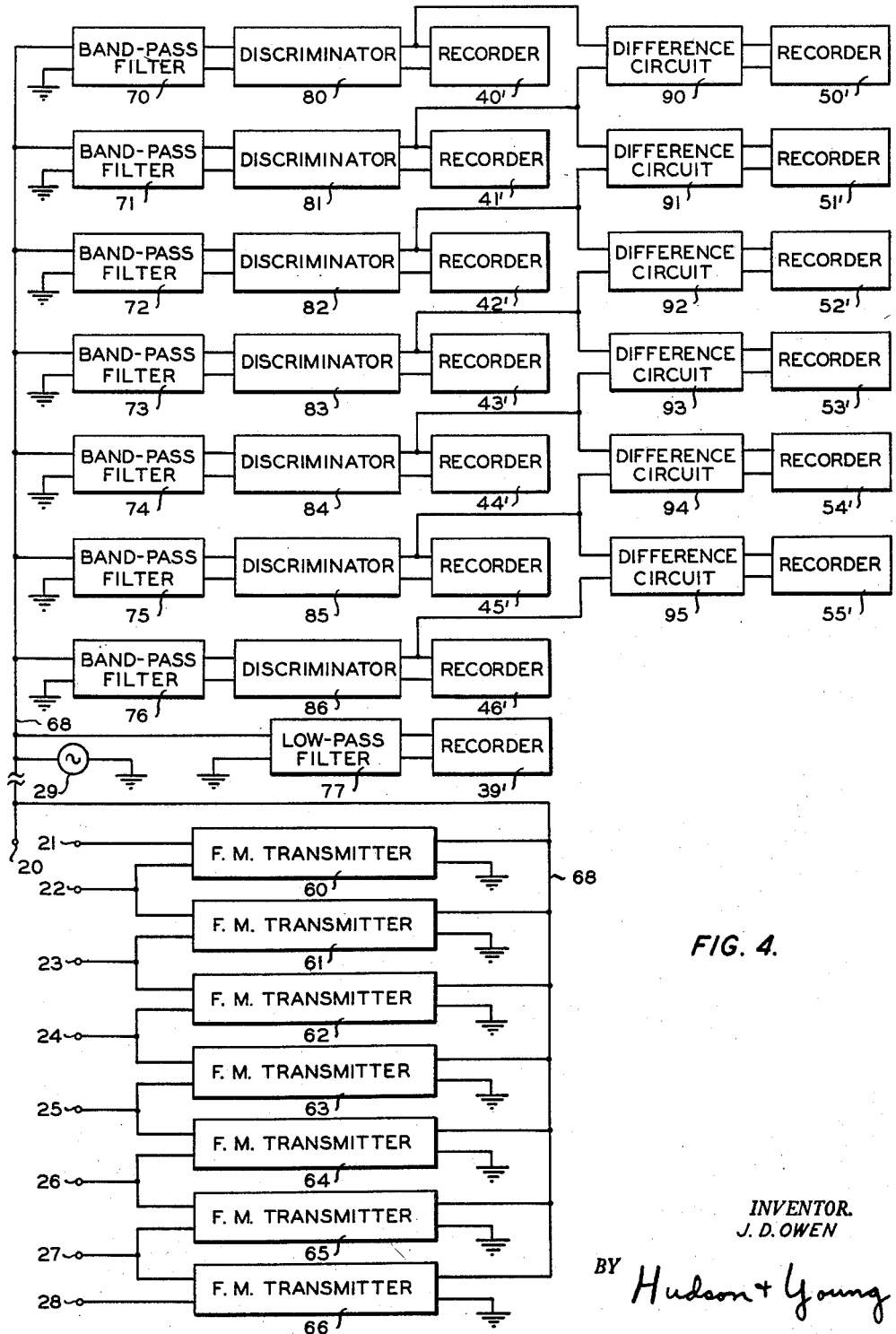
Figure 4 is a schematic circuit diagram of a second embodiment of the apparatus of this invention.

In most practical well logging operations, it is not convenient to provide cables having a large number of electrical leads. Various telemetering systems have, therefore, been developed to permit a large number of signals to be transmitted to the surface over a minimum number of leads. A telemetering system which can be employed to advantage in the present invention is illustrated in Figure 4. Signals representative of the several resistivity measurements are transmitted to the surface over a single conductor 68 which also supplies current to generating electrode 20. Current source 29 is of a first predetermined frequency, which can be in the order of 400 cycles per second, for example. The resistivity measurements are transmitted to the surface by signals of different individual frequencies. Electrodes 21 and 22 are connected to the respective input terminals of a first frequency modulated transmitter 60. This transmitter provides an output signal within a first frequency band which is of a frequency that is representative of the voltage differences between electrodes 21 and 22. Additional transmitters 61 to 66 are provided to measure the voltage differences between other adjacent electrodes. Transmitter 66, for example, measures the voltage differences between electrodes 27 and 28. Each of the transmitters provides an output signal within a different frequency band. The several signals can thus be transmitted to the surface of a single conductor without interference. Transmitters 60 to 66 are positioned in housing 10.

The surface equipment comprises a plurality of bandpass filters 70 to 76 which transmit frequencies in ranges corresponding to the output frequency ranges of transmitters 60 to 66, respectively. The output terminals of filter 70 to 76 are connected to the input terminals of respective discriminators 80 to 86. The output terminals of discriminators 80 to 86 are connected to the inputs of respective recorders 40' to 46'. These recorders provide signals which correspond to the signals measured by meters 40 to 46 of Figure 2. Corresponding first output terminals of discriminators 80 to 81 are connected to the respective input terminals of a difference circuit 90. The output of circuit 90 is connected to the input of a recorder 50' which corresponds to meter 50 of Figure 2. In like manner, corresponding output terminals of adjacent discriminators are connected to the respective inputs of different circuits 91 and 95. The outputs of these circuits are connected to the inputs of respective recorders 51' to 55'.

Figure 5:
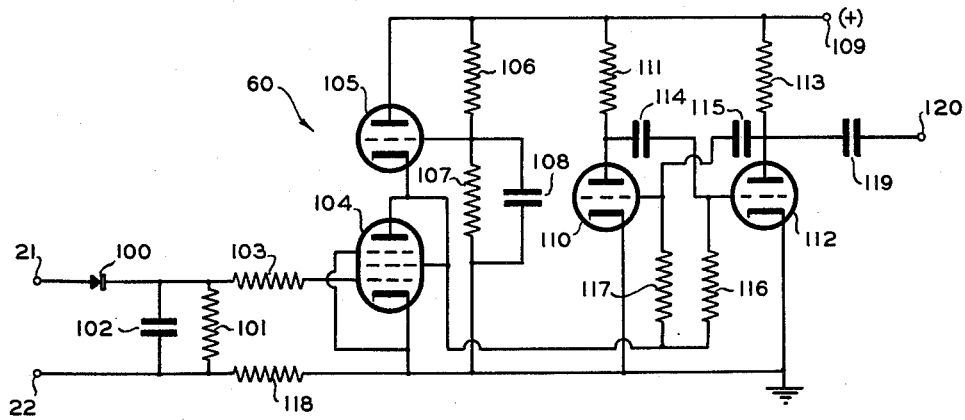
Figure 5 is a detailed schematic drawing of a suitable transmitter for use in the apparatus of Figure 4.

In Figure 5, there is shown a circuit which can be employed as transmitter 60, for example. Electrode 21 is connected through a rectifier 100 to the first terminal of a resistor 101. Electrode 22 is connected to the second terminal of resistor 101. A filter capacitor 102 is connected in parallel with resistor 101. The first terminal of resistor 101 is connected through a high value isolation resistor 103 to the control grid of a pentode 104. The second terminals of resistor 101 is connected to ground through an isolating resistor 118. The cathode and the suppressor grid of pentode 104 are connected directly to ground. The anode of pentode 104 is connected to the cathode of a triode 105. The anode of triode 105 is connected to a positive potential terminal 109. The control grid of triode 105 is connected to ground through a resistor 107 and to terminal 109 through a resistor 106. A capacitor 108 is connected in parallel with resistor 107. The cathodes of the pair of triodes 110 and 112 are connected to ground. The anodes of these triodes are connected to terminals 109 through respective resistors 111 and 113. The anode of triode 110 is connected to the control grid of triode 112 through a capacitor 114, and the anode of triode 112 is connected to the control grid of triode 110 through a capacitor 115. The control grids of triodes 110 and 112 are connected through respective resistors 117 and 116 to the anode of pentode 104. The anode of triode 112 is connected through a capacitor 119 to an output terminal 120 which in turn is connected to conductor 68 of Figure 4.

The circuit of Figure 5 comprises a modified multivibrator. The cathode follower action of triode 105 maintains the anode potential of pentode 104 at substantially a constant value. Any change in the voltage applied to the control of pentode 104 results in a change in current through pentode 104 and triode 105. This change in current can be considered as a change in resistance between ground and the anode of pentode 104. Such a change in resistance varies the time constant of the multivibrator so as to change the repetition rate thereof. Within certain limits, this change in repetition rate is substantially linear with a change in input voltage applied to the control grid of pentode 104. Thus, the frequency of the output signal is a function of the input voltage. Each of the multivibrators in the circuit of Figure 4 is selected to provide a basic output frequency which differs from the basic output frequencies of the other transmitters.

Figure 6:
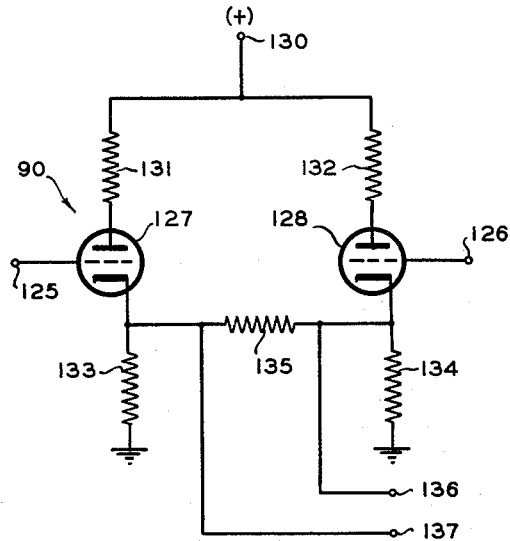
Figure 6 is a schematic circuit drawing of a suitable difference circuit for use in the apparatus of Figure 4.

A suitable difference circuit 90 of Figure 4 is illustrated in Figure 6. Input terminals 125 and 126 are connected to the control grid of respective triodes 127 and 128. The cathodes of these two triodes are grounded through respective resistors 133 and 134. The anodes of triodes 127 and 128 are connected through respective resistors 131 and 132 to a terminal 130 which is maintained at a positive potential. A resistor 135 is connected between the cathodes of triodes 127 and 128. Output terminals 136 and 137 are connected to the respective end terminals of resistor 135. The output potential between terminals 136 and 137 is thus representative of a difference between the input signals applied to terminals 125 and 126. This should be evident because of the cathode follower action of the two triodes.

The filter discriminators and recorders shown in Figure 4 can be conventional instruments well known in the art and for this reason are not described in detail. The recorders preferably are of the type which provide permanent photographic records.

In view of the foregoing description of a present preferred embodiment of this invention, it should be evident that there is provided improved apparatus for logging zones adjacent a bore hole which contain mobile hydrocarbons. The records provided by the well logging apparatus of this invention enables such zones to be located immediately without the need for time consuming calculations and correlations. Zones of mobile hydrocarbons are indicated immediately by deviations in the recorder outputs in opposite directions.

While the invention has been described in conjunction with present preferred embodiments, it should be evident that it is not limited thereto.

What is claimed is:

1. Electrical well logging apparatus comprising first, second, third, fourth, and fifth electrodes, means to suspend said electrodes in a bore hole so that said electrodes are spaced vertically in the order named, means to apply a current source between said first electrode and a point of reference potential, means to establish a first electrical signal representative of the potential difference between said second and third electrodes, means to establish a second signal representative of the potential difference between said third and fourth electrodes, means to establish a third signal representative of the potential difference between said fourth and fifth electrodes, means to measure the difference between said first and second signals, and means to measure the difference between said second and third signals.

2. The combination in accordance with claim 1 further comprising means to measure said first, second and third signals.

3. The combination in accordance with claim 1 further comprising means to measure the potential difference between at least one of said second, third, fourth and fifth electrodes and said point of reference potential.

4. Electrical well logging apparatus comprising a first electrode, a plurality of second electrodes, means to suspend said electrodes in a bore hole so that said second electrodes are spaced vertically from one another and from said first electrode, a current source connected between said first electrode and a region of reference potential, means to establish first electrical signals representative of the potential differences between adjacent pairs of said second electrodes, and means to measure the differences between said first electrical signals from adjacent pairs of said second electrodes.

5. The combination in accordance with claim 4 further comprising means to measure said first signals.

6. The combination in accordance with claim 4 further comprising means to measure the potential difference between at least one of said second electrodes and said region of reference potential.

7. Electrical well logging apparatus comprising a housing adapted to be lowered into a well, a cable attached to said housing to lower same into a well, said cable including first and second electrical conductors, a first electrode carried by said housing to contact fluid in the well, a plurality of second electrodes carried by said housing to contact fluid in the well, said second electrodes being spaced vertically from one another and from said first electrode when said housing is lowered into a well, a current source connected between said conductors, means connecting said first conductor to said first electrode, a plurality of signal transmitters carried by said housing, said transmitters providing output signals of different frequencies which are representative of potential differences applied thereto, means connecting adjacent pairs of said second electrodes to the inputs of respective ones of said transmitters, means connecting the outputs of said transmitters to said conductors, a plurality of filter means having the inputs thereof connected to said conductors, said filter means being adapted to transmit the frequencies of respective ones of said transmitters, and means to measure the differences between the outputs of pairs of said filter means representing the differences between potentials between adjacent pairs of said second electrodes.

8. The combination in accordance with claim 7 wherein said transmitters comprise frequency modulated transmitters, and wherein said means to measure comprise a plurality of discriminators, said discriminators having the inputs thereof connected to the outputs of respective ones of said filter means, and means to measure the voltage differences between the outputs of pairs of said discriminators.

9. The combination in accordance with claim 8 further comprising means to measure the outputs of said discriminators.

10. Electrical well logging apparatus comprising first, second, third and fourth electrodes, means to suspend said electrodes in a bore hole so that said electrodes are spaced vertically in the order named, means to apply a current source between said first electrode and a point of reference potential, means to establish a first electrical signal representative of the potential difference between said second and third electrodes, means to establish a signal representative of the potential difference between said third and fourth electrodes, and means to measure the difference between said first and second signals.

11. The combination in accordance with claim 10 further comprising means to measure said first and second.

12. The combination in accordance with claim 10 further comprising means to measure the potential difference between at least one of said second, third and fourth electrodes and said point of reference potential.

13. Electrical well logging apparatus comprising a housing adapted to be lowered into a well, a cable attached to said housing to lower same into a well, said cable including first and second electrical conductors, a first electrode carried by said housing to contact fluid in the well, second electrodes including at least two adjacent pairs of electrodes wherein one electrode is common to each of said two adjacent pairs, said second electrodes being carried by said housing to contact fluid in the well, said second electrodes being spaced vertically from one another and from said first electrode when said housing is lowered into a well, a current source connected between said conductors, means connecting said first conductor to said first electrode, a plurality of signal transmitters carried by said housing, said transmitters providing output signals of different frequencies which are representative of potential differences applied thereto, means connecting said adjacent pairs of said second electrodes to the inputs of respective ones of said transmitters, means connecting the outputs of said transmitters to said conductors, a plurality of filter means having the inputs thereof connected to said conductors, said filter means being adapted to transmit the frequencies of respective ones of said transmitters, and means to measure the differences between the outputs of pairs of said filter means representing the differences between potentials between said adjacent pairs of said second electrodes.

References Cited in the file of this patent

UNITED STATES PATENTS

| Number | Name | Date |
|---|---|---|
| 2,370,162 | Hare | Feb. 27, 1945 |
| 2,573,133 | Greer | Oct. 30, 1951 |
| 2,573,137 | Greer | Oct. 30, 1951 |
| 2,654,064 | Broding | Sept. 29, 1953 |
| 2,754,475 | Norelius | July 10, 1956 |
| 2,782,364 | Shuler | Feb. 19, 1957 |
| 2,790,137 | Mayes | Apr. 23, 1957 |

UNITED STATES PATENT OFFICE
CERTIFICATE OF CORRECTION

Patent No. 2,920,266　　　　　　　　　　　　　　　January 5, 1960

Joe D. Owen

It is hereby certified that error appears in the printed specification of the above numbered patent requiring correction and that the said Letters Patent should read as corrected below.

Column 6, line 28, before "signal" insert -- second --; line 32, for "and sec-" read -- and second signals. --.

Signed and sealed this 26th day of July 1960.

SEAL)
Attest:

KARL H. AXLINE
Attesting Officer

ROBERT C. WATSON
Commissioner of Patents